(12) United States Patent
Stokes (10) Patent No.: US 9,022,332 B2
(45) Date of Patent: May 5, 2015

(54) CLAMPING SYSTEM AND SELF ADVANCING SUPPORT PLATFORM

(75) Inventor: Kevan Frederick Stokes, Aberdeen (GB)

(73) Assignee: ITI Scotland Limited, Glasgow (GB)

( * ) Notice: Subject to any disclaimer, the term of this patent is extended or adjusted under 35 U.S.C. 154(b) by 485 days.

(21) Appl. No.: 12/991,337

(22) PCT Filed: May 8, 2009

(86) PCT No.: PCT/GB2009/001136
§ 371 (c)(1),
(2), (4) Date: Jan. 18, 2011

(87) PCT Pub. No.: WO2009/136159
PCT Pub. Date: Nov. 12, 2009

(65) Prior Publication Data
US 2011/0116864 A1 May 19, 2011

(30) Foreign Application Priority Data

May 8, 2008 (GB) .................................. 0808336.2

(51) Int. Cl.
*F16B 2/10* (2006.01)
*B66C 1/42* (2006.01)
*B66C 1/62* (2006.01)

(52) U.S. Cl.
CPC ........... *B66C 1/427* (2013.01); *Y10T 403/7062* (2015.01); *B66C 1/62* (2013.01)

(58) Field of Classification Search
USPC ............ 248/230.1, 230.4, 74.1, 316.1, 316.5, 248/218.4, 282.1, 282.11
See application file for complete search history.

(56) References Cited

U.S. PATENT DOCUMENTS

| RE20,653 | E | * | 2/1938 | Lamb ............................. 182/113 |
| 3,641,800 | A | * | 2/1972 | Wickham ......................... 72/299 |
| 7,264,212 | B2 | * | 9/2007 | Hung ......................... 248/282.1 |
| 8,201,787 | B2 | * | 6/2012 | Ingram et al. .............. 248/218.4 |

FOREIGN PATENT DOCUMENTS

| DE | 19647515 A1 | 5/1998 |
| DE | 20018890 U1 | 6/2000 |
| DE | 10321850 A1 | 12/2004 |
| EP | 2380181 A | 2/2003 |
| EP | 1857670 A1 | 5/2006 |
| EP | 1518053 B1 | 8/2008 |

(Continued)

OTHER PUBLICATIONS

PCT/GB2009/001136 Notification of Transmittal of the International Search Report and the Written Opinion of the International Searching Authority, or the Declaration, dated Aug. 11, 2009.

(Continued)

*Primary Examiner* — Steven Marsh
(74) *Attorney, Agent, or Firm* — Edmonds & Nolte, PC (57) ABSTRACT

Clamp for clamping an article including a plurality of pads (10) which may be arranged in a circle around a support frame (90) and pivotally connected thereto by pivot arms (26) pivotable about an axis parallel to the axis of an article (92) to which the pads (10) are to be clamped. The pads (10) are supported on the arms (26) by ball-joints or universal joints (48) such as to ensure any off-center load L is passed through said pads (10) as a vertical load having no radial component.

25 Claims, 9 Drawing Sheets

(56) References Cited

FOREIGN PATENT DOCUMENTS

| WO | 98/50223 | 11/1998 |
| WO | 2004/022970 A1 | 3/2004 |
| WO | 2005/005822 A1 | 1/2005 |
| WO | 2006/077358 A1 | 7/2006 |

OTHER PUBLICATIONS

GB0808336.2 UK Search Report dated Jun. 20, 2008.
Notification Concerning Transmittal of International Preliminary Report on Patentability, issued by the International Bureau of WIPO, dated Nov. 18, 2010, 8 pages.

* cited by examiner

CLAMPING SYSTEM AND SELF ADVANCING SUPPORT PLATFORM

This application is a United States national phase application of co-pending international patent application number PCT/GB2009/001136, filed May 8, 2009, which claims the benefit of the filing date of GB patent application number 0808336.2, filed May 8, 2008, the disclosures of which are incorporated herein by reference.

The present invention relates to a clamping system and relates particularly but not exclusively to a self advancing clamping system forming part of a support platform and to support platforms having such a clamping system.

One of the problems associated with the ever expanding introduction of wind turbines and the like resides in the complexity associated with the maintenance of the generators and gearboxes positioned at the top of what can often be very tall and slender towers. It is particularly difficult to access such components from the ground and maintenance thereof whilst they are still positioned atop of the tower is problematic not least because of the lack of maintenance platforms and crane facilities at the top of said towers. Additionally, the towers are often made as relatively thin walled structures which, whilst being perfectly suitable for supporting the wind turbine and ancillary equipment, do not lend themselves to use as an anchor point for a movable maintenance platform that might be moved into position atop of the tower as and when needed.

WO2004/022970 discloses one possible solution to this problem in which a movable platform is raised to the top of a wind turbine tower by a cable system passing over pulleys provided towards the top of the tower itself. The system relies on a support vehicle to power a winching system to elevate the support platform but does provide a clamping mechanism comprising a pair of mutually opposed curved pads which, in operation, are clamped around the tower structure so as to maintain the platform in position. The platform itself is not self-advancing.

DE19647515 discloses a system for assembling a wind turbine comprising a plurality of pre-fabricated tubular sections and includes a self-advancing crane having an upper and a lower ring positioned in the crane jib and its base respectively which, in operation encircle the tower and act as alternate support rings during a self-advancing step in which the crane climbs the tower so as to position itself atop of the last positioned section. Once at the top of the tower the jib is positioned so as to allow the jib to pick up and position the next section. In an alternative arrangement of the invention the crane is self advanced by means of a plurality of cables secured to the top of an already positioned section and a winch mechanism on the base of the crane itself which winches the crane up the cables. A clamping arrangement comprising a plurality of one rings extending around at least a significant portion of the circumference of the tubular section are used to maintain the crane in an operable position atop of the associated section. The rings of these examples are likely to induce high local stresses in the structure itself and may well not lend themselves to use on thin walled structures which may be adversely affected by such stresses.

PCT/GB/2005/000181 provides an alternative arrangement of clamp and a self-advancing support structure on top of which may be mounted a maintenance platform. The arrangement includes an upper and a lower clamping arrangement and an intermediate member having the ability to adjust its length such as to allow the distance between the clamps to be varied. The clamps themselves comprise a plurality of circumferentially extending segments supported on a frame by means of support and actuation members pivotable about generally horizontal axes. In operation, the arrangement is advanced up a tower by first clamping the lower clamp and causing the upper unclamped clamp to be elevated before clamping the upper clamp and elevating the lower clamp whilst it is in an unclamped state. By repeating these simple steps it is possible to advance the structure up a tower such as to position it atop thereof so as to act as a support platform or the like. Whilst such an arrangement may provide adequate support the supporting of the pads is such as to cause the radial loading on the tower to be increased in proportion to the mass of any load carried on the associated platform. This can be particularly problematic if the structure comprises a thin walled tubular structure as the increase in load may be relatively local and may result in local buckling or bending, which is clearly undesirable as it could lead to premature failure of the structure itself. This can be a particular problem when the platform is used as a crane mounting and a heavy load is carried by the crane such as to exert an off-axis load on the tower itself.

In view of the above, there therefore still exists a requirement for a clamping system suitable for use on towers and the like which reduces and possibly eliminates the problems of the prior art. Accordingly, a first aspect of the present invention provides a clamp for clamping a tubular article, the clamp comprising: one or more clamp pads for clamping to a tubular article; a support arm for each of said one or more clamping pads; an annular support frame having a longitudinal axis and having an inner and an outer portion and upon which said support arms are mounted for pivotal movement between a first, retracted, position and a second, contracted, position, wherein said support arms are mounted for pivotal movement about a longitudinal axis parallel to the longitudinal axis of said support frame. By mounting the clamps in this manner it is possible to avoid the application of an off-centre load to the platform causing or creating an increase in the local radial forces exerted by the clamps on the tower itself.

Preferably, said one or more support arms comprise coupling portions for coupling to associated clamp pads and said associated clamp pads include corresponding coupling portions of coupling to said support arms, wherein said clamp pads each comprise edges and a mid portion and wherein said clamp pad coupling portions comprise two such portions, one such portion being positioned on either side of said mid portion of said pad. In a particularly preferred arrangement the coupling portions comprise spherical ball joint couplings but they may equally comprise universal joints.

When the arrangement of the present invention is used on a curved surface it is preferable that the clamp pads comprise conformable clamp pads, each being conformable to a range of curvatures corresponding to the article to which they are to be clamped.

In a preferred arrangement said one or more clamp pads comprise a plurality of longitudinally extending segments, each segment being adjoined to its neighbor by an articulated joint and may include a compliant surface, such as rubber or the like, on a clamping side thereof. The pads may also include tapered edges which, in operation, reduce the clamping force exerted by said clamps towards the edge of said pads. Alternatively, said compliant surface may include tapered edges, which, in operation, reduce the clamping force exerted by said clamps towards the edge of said pads.

In an arrangement which accommodates the taper on a tower or structure on which the present invention may be used, said one or more pads taper between a minimum width at a top thereof to a maximum at a lower end thereof.

Preferably, said one or more clamping pads comprise an upper portion, a lower portion and a mid portion and in which said one or more support arms are connected to said one or more pads at a point above said mid portion so as to more evenly apply any applied load.

Advantageously, the arrangement includes an actuation mechanism, such as a mechanical, hydraulic, pneumatic or electric actuation system, for moving said one or more support arms between a first, disengaged, position and a second, engaged, position in which said one or more pads engage with an associated tubular article and also includes an actuator controller for actuating said actuators as and when required.

In an arrangement particularly suited to use on towers with circular cross-sections, the arrangement includes a plurality of said clamps arranged in a circle around a common axis.

In order to secure the pads in place it is desirable to include a securing means which may take the form of a circumferentially extending securing member and a securing member actuator for actuating said securing member as and when required. In a preferred arrangement which assists with the application of an even load, said securing member comprises a cable extending between two or more clamping pads and acting on an outer side thereof such as to cause said pads to be clamped onto a tubular member when engaged therewith.

In alternative embodiments, the cable may be replaced by one or more bands or straps. In order to make the cables, bands or straps highly flexible yet light and strong, they may be formed from aramid fibres or yarns. In order to minimize abrasion of the tubular structure and to reduce the pressure applied locally to the tubular structure, the securing member may comprise a flat section strap.

The above may be adapted to provide a climbing arrangement comprising a first, upper, clamp and a second, lower, clamp each as described above and further including a joining portion joining said upper and lower clamps to each other, said joining portion extending between the support frames of said upper and lower clamps. Preferably, the joining portion comprises an adjustable portion adjustable between a first, contracted, state and a second, expanded, state such as to cause the upper and lower clamps to be moved closer to or further apart form each other as and when desired and the arrangement also includes an actuation mechanism for extending and retracting said adjustable portion as and when required. An extension controller may also be provided for controlling the extension and contraction of the actuation mechanism as and when required.

In an alternative embodiment of the present invention there is provided a clamping arrangement as described above and including a crane comprising an upper portion and a lower portion pivotally connected to said annular support frame and including at said upper end a crane jib and at a lower end a reaction pad for engagement with a structure to which the clamp may be secured such that, in operation, any horizontal load applied to the crane jib may be reacted through a lower portion of the structure to which the arrangement may be clamped. Preferably, the reaction pad comprises a conformable pad and is connected to said lower portion of said crane by means of a cable.

According to another aspect of the present invention there is provided a crane comprising an elongate frame and a mounting arrangement for attachment to a structure, the frame being pivotably connected to the mounting arrangement at an intermediate position along its length, so that the frame is divided into a lifting portion on one side of the pivotal connection and a reaction portion on the other side of the pivotable connection, the lifting portion comprising a crane jib and the reaction portion being connected to a reaction pad for engagement with the structure.

The reaction pad may engage a different part of the structure from the part to which the mounting arrangement is attached.

The reaction pad may be engaged with the structure below the mounting arrangement.

The reaction pad may be connected to the reaction portion of the crane by means of a flexible or rigid member. For example the reaction pad may be connected to the reaction portion of the frame by means of one or more cables, bands, belts, or struts, such as are described above in relation to the securing member of the first aspect of the invention. For example, the reaction pad may be connected to the frame by means of one or more flat section straps made from aramid yarn.

If the reaction pad is connected to the frame by means of a strut, it may be extendable and contractable by means of an actuator. The actuator may, for example, comprise a mechanical, pneumatic, hydraulic or electrical actuator. By using an actuator, the crane jib can be moved relative to the structure by operation of the actuator. This improves the lifting range of the jib, and enables the use of a shorter and hence lighter jib.

The crane jib may be pivotably attached to the frame.

The crane jib may be moved relative to the frame by means of one or more actuators. For example, the actuators may comprise mechanical, hydraulic, pneumatic or electrical actuators.

The crane may comprise two elongate frames, one on each side of the mounting arrangement.

A load to be carried by the crane may be supported on a cable suspended from a member interconnecting the two elongate frames. The member provides additional rigidity and stability to the crane structure, and resists twisting of the crane under load.

The present invention will now be more particularly described by way of example only with reference to the accompanying drawings, in which.

Figure 1:
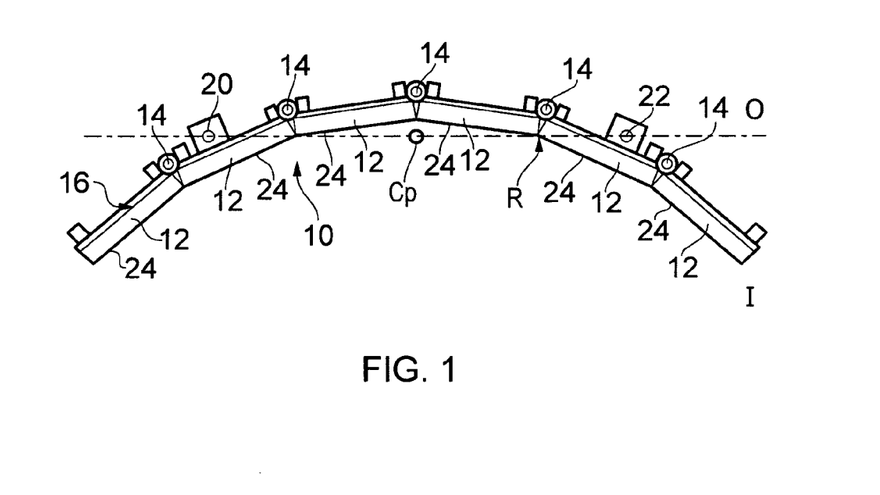
FIG. 1 is a cross-sectional view of a clamp pad according to the present invention.

Referring now to the drawings in general but particularly to FIG. 1, the clamping pad 10 of the present invention comprises a series of longitudinally extending strip elements 12 joined to adjacent neighbors by hinges or the like and shown generally at 14. Such hinges 14 may take the form of actual pin hinges or may be formed by virtue of a backing member 16 comprising a flexible material such as sheet metal, plastic or a composite. The function of the hinges is to allow the group of strip elements to conform to the curvature of an article against which it is placed. Also clear from FIG. 1 are the positions of the mounting points 20, 22 on the pad 10 itself. These mounting points are positioned on either side of the central portion of the pad and arranged such that, for an operable radius of curvature R, a load applied vertically downwardly (or upwardly) through mounting points 20, 22 on the outer side O will pass through the centre of pressure or effort at a point $C_p$ on the inner side I of the pad 10. This feature is important and is discussed in more detail later herein. The inner surface 24 of each strip may be covered with a compliant material such as foam or rubber so as to assist with the accommodation of any variation in radius of curvature that can not be accommodated by the flexibility of any portion of the strip elements 12. Indeed, within the width of any strip, the compliant material may be the only portion that is able to conform to the curvature of an article against which the strips are placed. This would allow stronger and more rigid backing elements to be employed.

Figure 2:
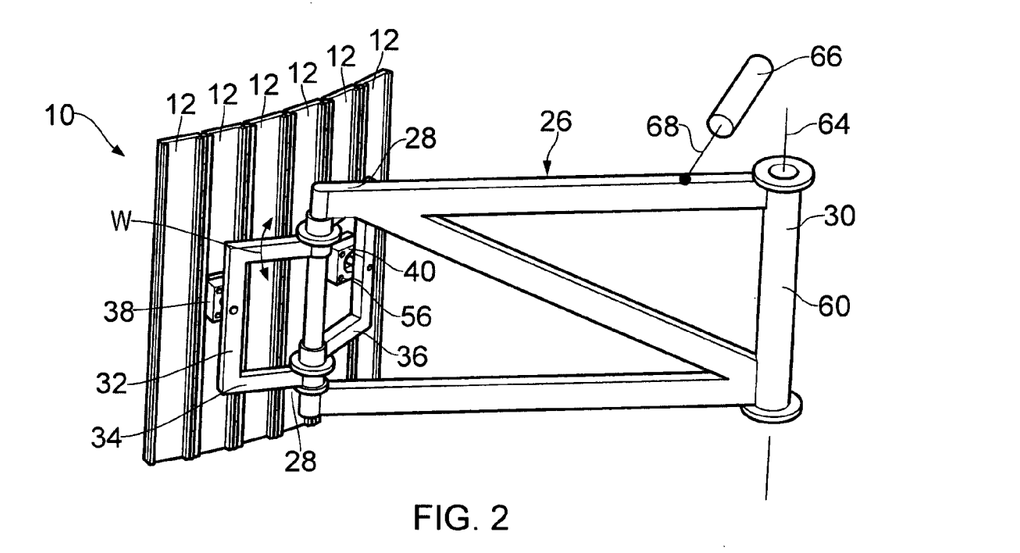
FIG. 2 is a general view of the clamp pad of FIG. 1 further illustrating the mounting and support mechanism associated therewith.

Referring now to FIG. 2, the clamping pad 10 of FIG. 1 is supported on a support arm shown generally at 26 and comprising in more detail a pad mounting end 28 and a frame mounting end 30. The pad end 28 is provided with a support 32 linking it with the pad 10 and preferably comprising a pair of side arms 34, 36, each of which is pivotally mounted about a substantially vertical axis A so as to allow the side arms to move inwards and outwards as indicated by arrow W. Each side arm 34, 36 is provided with a mounting point 38, 40, also shown in detail in FIGS. 4 to 6. Each mounting point has a first member 42 mounted on a respective arm 34, 36 and extending towards the pad 10 such that a distal end thereof may be captured by a securing portion 44 mounted on said pad 10. Preferably, the distal end of the first member includes a universal joint in the form of, for example, a ball joint 48 and the associated securing portion comprises a corresponding mounting block 50 having an aperture 52 and a corresponding spherical profile 54. The spherical ball joint 48 is sized such that it is unable to pass through the aperture 52 but otherwise cooperates with the spherical surface 54 of the mounting block 50 such as to allow the plate to articulate around said spherical ball joint assembly of ball 48 and spherical profile 54. In turn, the mounting block may be secured to the pad 10 by screws 56 or any other such suitable means. The pad side of the mounting block is also provided with a spherical surface 58 against which, in operation, the spherical ball end 48 acts when the pads 10 are urged into contact with a tubular article associated therewith. The frame mounting end is provided with a generally vertically extending tubular portion 60 through which a pin 62 passes before being secured in upper and lower mounting blocks 64 (shown in the singular in FIG. 2) secured to the frame structure discussed later herein. An actuator 66 also secured to the frame is provided with a movable portion 68 attached to the support arm 26 for causing said arm to move about pin 62 as and when desired such as to move the pad 10 inwardly or outwardly as will be discussed later herein.

Figure 3:
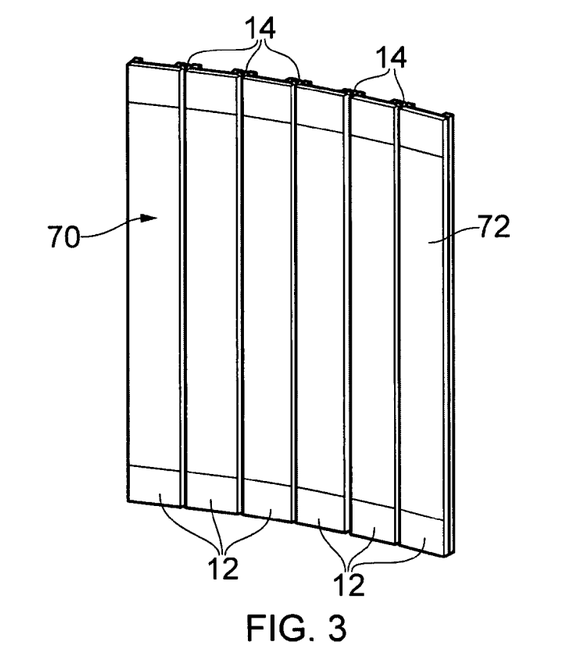
FIGS. 3 and 4 are front and rear elevations of the pad respectively.

Reference is now made to FIG. 3 which illustrates in more detail the inner surface 70 of a pad 10 and from which it will be appreciated that each segment 12 abuts up against its neighbour in an articulated fashion such as to allow the pad 10 to adopt a radius of curvature associated with a tubular article against which it may be placed. It will also be appreciated that if the segments are made from relatively compliant material, such as plastic or flexible metals, the segments will each curve to a desired profile upon the application of an external force sufficient to cause such deformation and discussed later herein. Alternatively, if each segment 12 is made from relatively stiff material such as metal plate or a composite structure, it may not be possible to cause sufficient curvature thereof by the simple application of an external load. For such situations it may be desirable to apply an inner coating to each pad formed from a compliant material 72 such as, for example, foam or rubber including silicon rubber and other such suitable materials. The compliant nature of such materials will allow for the use of relatively stiff and un-flexible backing segments 12 as the foam or rubber will conform to the curvature of any tubular article against which the pad 10 is situated. It may be desirable to provide this compliant layer even when employing a compliant backing segment as it will also act to even out force transfer onto the tubular structure and avoid or reduce spot loadings that could be created. To further enhance the even loading aspect of the pad 10, it may also be desirable to taper the edges of the compliant layer towards the edges of the pad 10, as shown at 74 so as to prevent the edges 76, 78 themselves exerting excessive loading on the tubular structure. As an alternative, this effect could be achieved by altering the material properties of the compliant layer towards the upper and lower and outer side edges such that it is more compliant and, therefore, exerts less load when compressed. Also well illustrated in FIG. 3 and FIG. 4 are vertically extending ribs 80 which help stiffen the segments 12 and form an edge against which hinges 14 may be secured.

Figure 4:
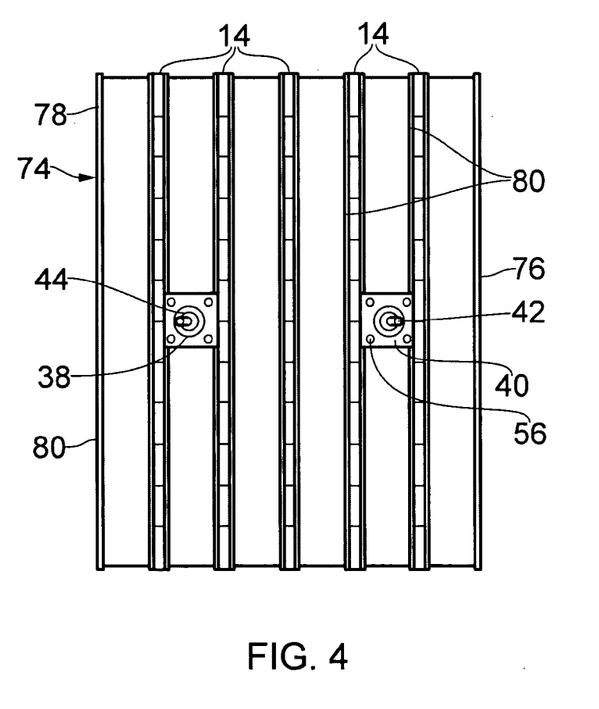

FIG. 4 provides more detail of the mounting arrangement between the pad 10 and the support arm 26 and from which it can be seen that the pad mounting points 38, 40 are positioned on individual segments 12 displaced from the edges 78, 80 of the pad 10.

Figure 5:
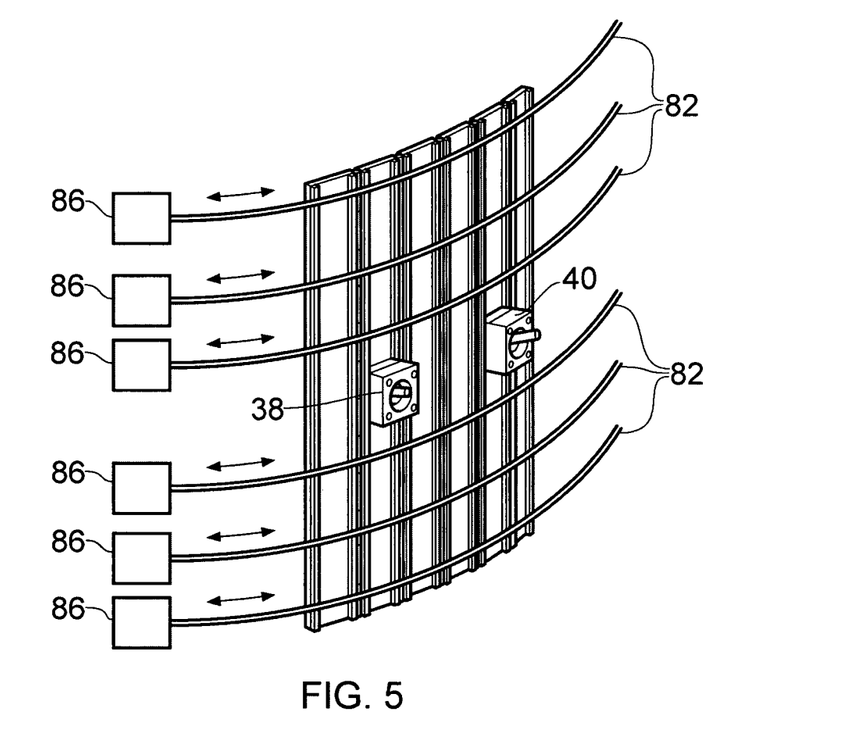
FIG. 5 illustrates the clamp pad as it would be positioned when clamped against a tubular structure and further illustrates a plurality of securing bands shown in the form of cables.

The arrangement of FIG. 5 adds a plurality of circumferentially extending cables, belts or bands to the assembly. In the illustrated embodiment, cables 82 pass over the outer surface 84 of the pad 10 and are coupled to an actuation mechanism shown schematically at 86 for causing said cables to be tightened against said pads 10 or relaxed relative thereto as and when desired. As the cables are tightened the segments 12 of the pad 10 are each caused to conform to the profile of any structure against which they are placed and each segment 12 is loaded evenly against said structure. This is the mechanism by which the pads 10 are clamped to the tower so as to ensure secure location thereof. Details of the actual clamping process are described later herein.

In order to minimize abrasion of the tubular structure and to reduce the pressure applied locally to the tubular structure, the cables 82 may be replaced by flat section straps. In order to make the straps highly flexible yet light and strong, they may be formed from aramid fibres or yarns, such as are produced by Roblon (RTM) industrial fibre division.

Figure 6:
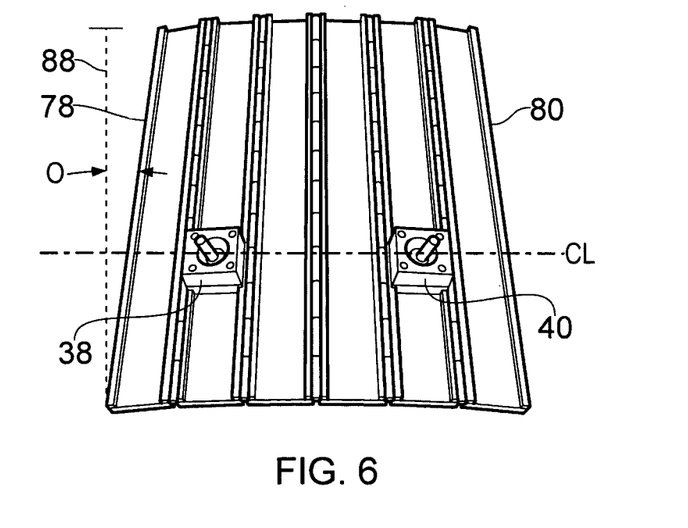
FIG. 6 is a detailed view of the rear of the pad illustrating in detail the positioning and nature of articulated joints which link it to the associated support mechanism associated therewith.

FIG. 6 illustrates another optional aspect of the present invention of particular use when the invention is being employed on tapered towers or columns. In this arrangement the pads 10 themselves are also tapered as illustrated by the gap between vertical line 88 and the edge 78, 80. Those skilled in the art will appreciate that a pad tapered in this manner will be able to fit more closely against its immediately adjacent neighbour when a plurality of said pads are arranged in a circumferential manner around a tapered tubular structure. The angle of taper θ is preferably selected to match that of the taper of any tapered structure against which the pads are to be positioned such as to allow the pads to abut neatly up against their neighbors when at the narrowest point of taper and thereby reduce to a minimum any edge loading effects that might otherwise be present due to gaps between pads 10. This aspect of the present invention is of particular benefit when employing the arrangement on tapered towers with the narrowest and, hence, weakest portion towards a narrow top portion, such as one might find on a wind turbine tower or the like. At such a position it is extremely desirable to ensure that any clamping loads are evenly distributed around the entire circumference of the structure and local pinch points or areas of excessive load are reduced to a minimum or eliminated. The vertical position of the mounting points 38, 40 is also well illustrated in FIG. 6 and from which it will be appreciated that they may be well placed for load transfer purposes if they are positioned on the center line CL of the pad 10. Alternatively, the mounting points 38, 40 may be positioned slightly below the centre line CL such as to ensure an even load distribution between the portion above and below the mounting points, which is of particular interest when tapered pads are employed.

Figure 7:
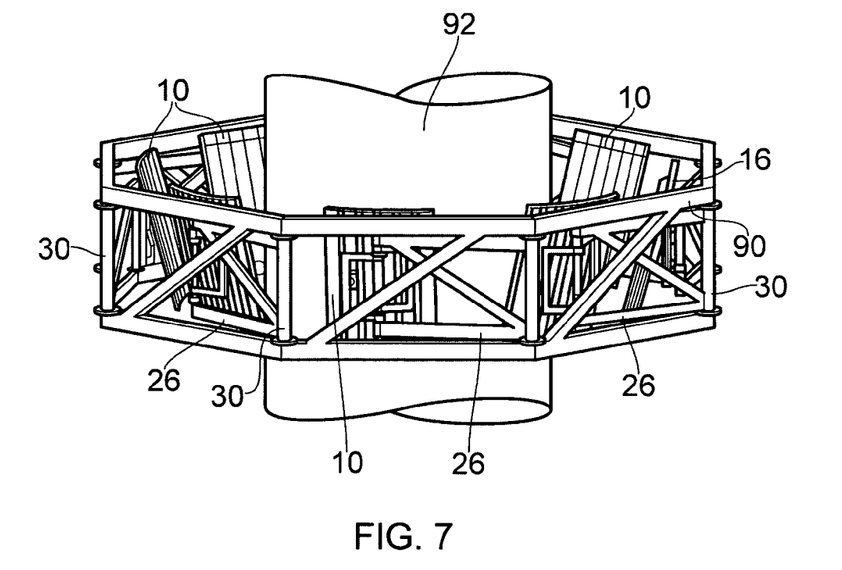
FIGS. 7 and 8 illustrate are general views of a clamp arrangement in unclamped and clamped modes respectively.
Figure 8:
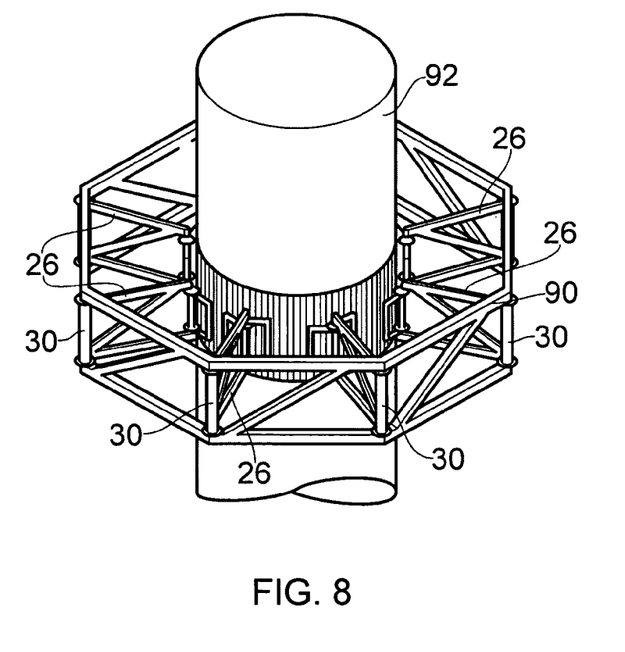

FIGS. 7 and 8 illustrate the clamping arrangement of FIGS. 1 to 6 provided as a plurality of clamps arranged in a support frame 90 and arranged in a circumferential manner around a tubular structure 92. FIG. 7 illustrates the clamps in a retracted position in which it will be appreciated that the pads 10 are clear of the tubular structure itself whilst FIG. 8 illustrates the clamps in an actuated position in which the pads 10 are engaged with the tubular structure and, in this figure, fully encircle the tubular structure itself so as to provide an even clamping effect. It will be appreciated that, in practice, it would be extremely desirable to size the pads 10 and actuation mechanism of any such arrangement such that the pads are positioned as in FIG. 8 when the arrangement is at its operating position. The example of FIGS. 7 and 8 may be employed as a clamp to secure a tubular structure or a platform secured to a tubular structure by the clamps and pads themselves but is relatively immobile without external assistance.

Figure 9:
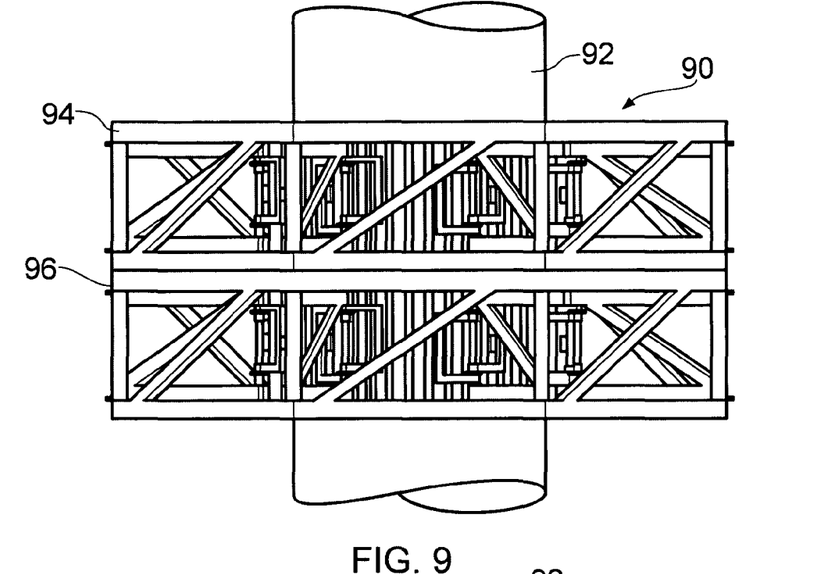
FIGS. 9 and 10 illustrate the self-advancing aspect of the present invention.
Figure 10:
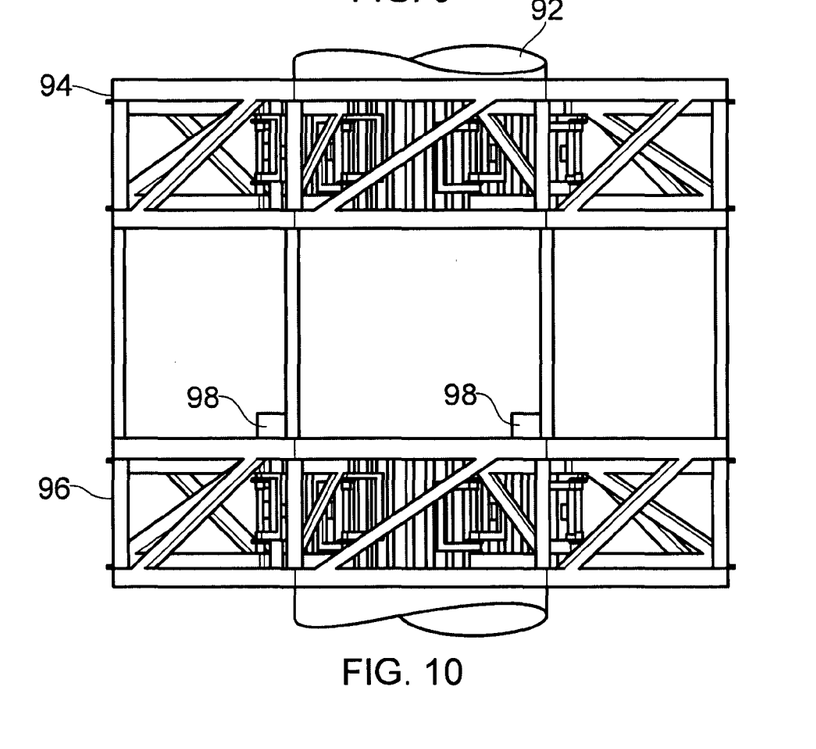

FIGS. 9 and 10 illustrate the clamping arrangement of FIGS. 1 to 8 applied as mobile structure comprising a series of circumferentially spaced clamping members around a frame or support structure 90 having upper and lower portions 94, 96 respectively encircling the tubular structure 92 and having a longitudinal generally vertical axis L. Each of the upper and lower portions is provided with a clamping arrangement which, in operation, are operated in unison to not only clamp the support structure 90 to the tubular structure 92 but allow said structure to advance up the tubular structure as and when desired by sequential operation of the clamping members and expansion of a gap G between upper and lower portions 94, 96 by the operation of a jacking mechanism shown schematically at 98. Assuming FIG. 9 illustrates the structure at the bottom of a tower, the sequence of steps to advance the structure comprises:

i) move lower clamp pads 10a into position adjacent the tubular structure;
ii) clamping said lower pads 10a against said structure by actuating actuator 66 and/or cables 82 and actuators 86;
iii) releasing the upper pads 10b by relaxing cables 82 and partially retracting arms 26;
iv) Extending the jacking mechanism 98 such as to raise upper portion 94 to an upper position;
v) Re- engaging the upper pads 10a and clamp arrangements such as to grip the tubular structure;
vi) Releasing the lower pads 10a and clamps;
vii) Retracting the jacking mechanism such as to pull the lower portion 96 upwardly in the direction of arrow U until it meets the upper portion 94 before re-engaging the lower pads 10a and clamping arrangement to secure the lower portion to the tubular structure; and
viii) Repeating the above steps as often as necessary to advance the support to a desired position.

Lowering of the structure simply requires the reversal of the above steps.

Figure 11A:
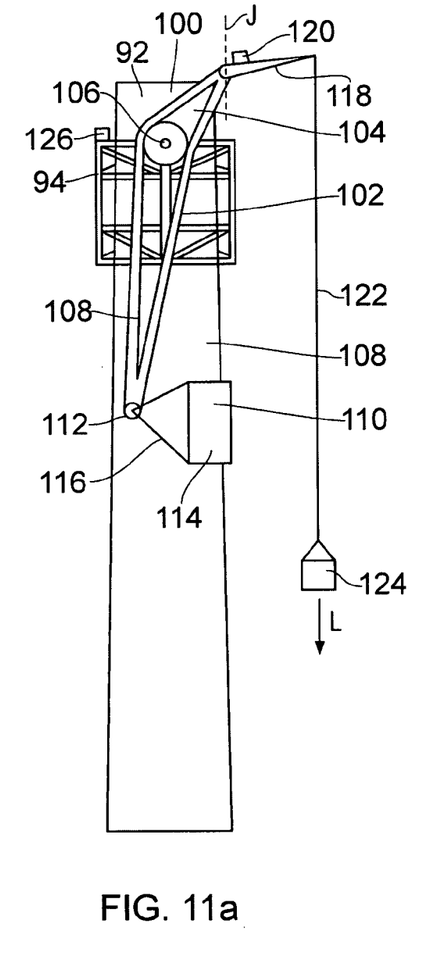
FIGS. 11a to 11c illustrate an optional support for use with a crane.
Figure 11B:
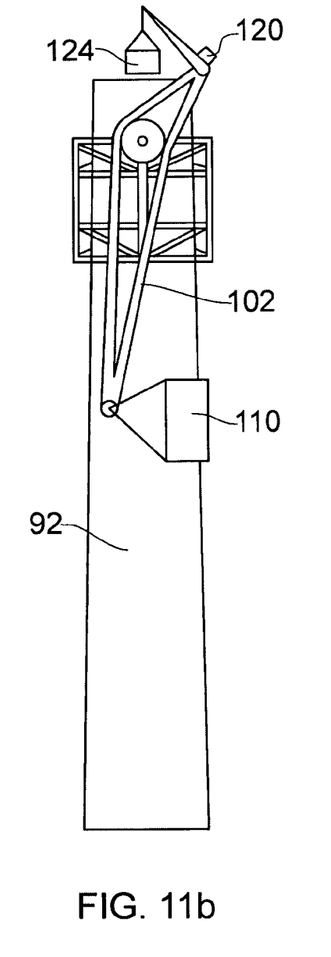

FIGS. 11a and 11b illustrate a still further aspect of the present invention in which a self-advancing arrangement such as that shown in and discussed with reference to FIGS. 9 and 10 is married to a crane structure shown generally at 100 and comprising a generally triangular support frame 102 having an upper portion 104 connected to an upper frame 94 by, for example, pivot pins 106. A lower portion 108 of the frame 102 is provided with a reaction pad 110 preferably pivotally connected thereto by pins 112 and having a surface 114 profiled to conform to that of the structure 92 against which, in operation, it will rest. The reaction pad 110 may be of the same form as that described above with reference to pad 10 and may also be mounted to the lower portion 108 by means of cables 116. Upper portion 104 is provided with a movable crane jib 118 and a cable winching mechanism shown schematically at 120 for raising and lowering cable 122 as and when it is desired to raise or lower an article 124. The reader will appreciate that the crane may be advanced up the tower by employing the jacking steps as discussed in FIGS. 9 and 10 and, if the jib is such as to be able to turn inwards by rotation about axis J, the crane may also deliver a payload to the top of the tubular structure itself. Alternatively, the crane may be employed to remove an article such as a wind turbine gearbox, generator or propeller form the top of a completed wind turbine structure. The reader will also appreciate that when a payload 124 is supported by the crane the reaction forces into the tubular structure are split into a vertical load component which is passed into the clamps in line with the centre of pressure discussed with reference to FIG. 1 above and a horizontal load component which is passed into a lower and therefore stronger portion of the tubular structure 92 via conformable pad 110. The final component of the above arrangement comprises a controller shown schematically at 126 which is operably connected to each of the actuators 66 and the jacks 98 such as to operate them as and when required to clamp and advance the arrangement described herein.

Figure 11C:
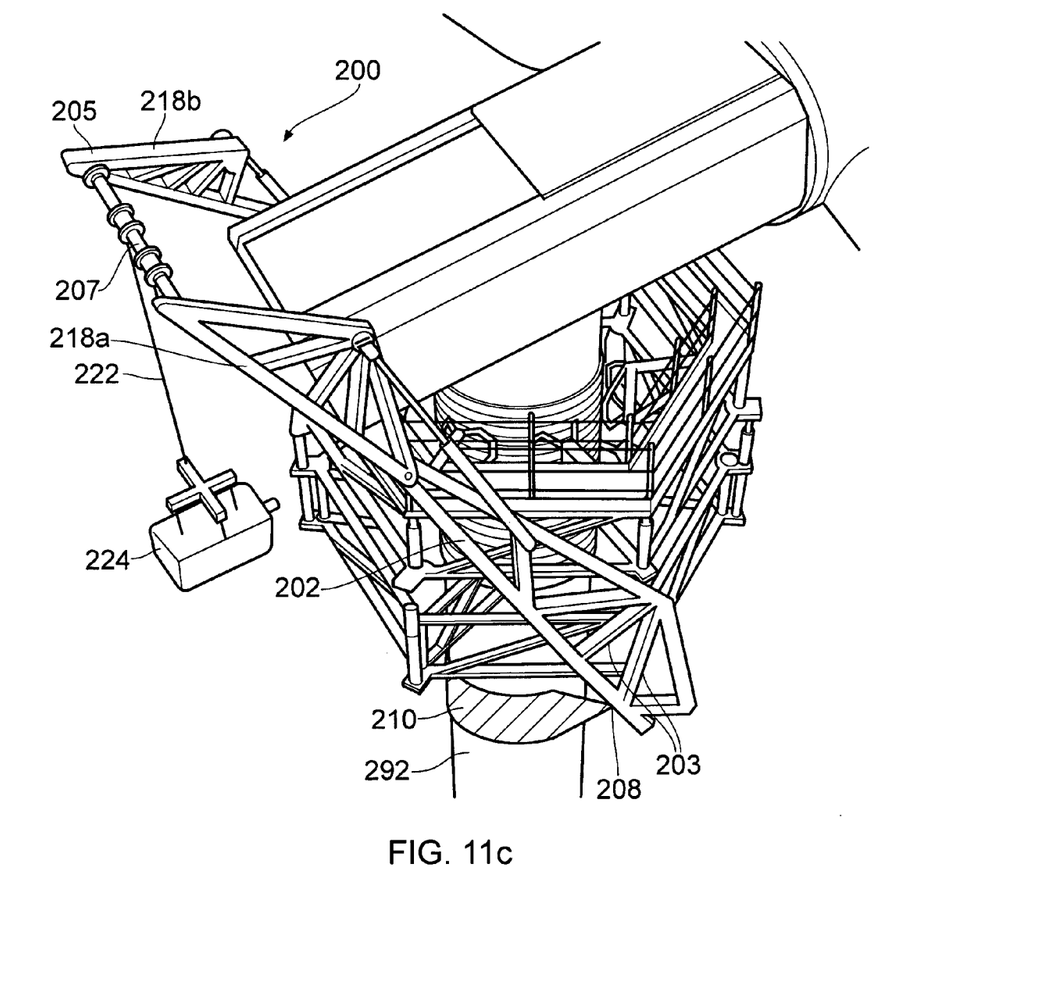

FIG. 11c shows a crane structure 200 with modified support frames 202, which are provided with additional bracing 203. The free ends 205 of moveable crane jibs 218a, 218b are interconnected by a cable guide 207 which guides cable 222 as it raises or lowers article 224. As in the previous embodiments, lower portions 208 of the support frames 202 are connected to reaction pad 210, such that the off-centre loads transmitted to the support frames 202 by the article 224 and by the unbalanced mass of the crane structure are transmitted safely into the tower structure 292 by the reaction pad 210.

Although the crane structure, as described and illustrated above, is attached to a self advancing climbing mechanism, it is to be understood that it could be modified for use with any mounting or support arrangement for attachment to a tower structure or to any other structure. For example it could be used on part of an oil rig or communications tower.

Figure 12:
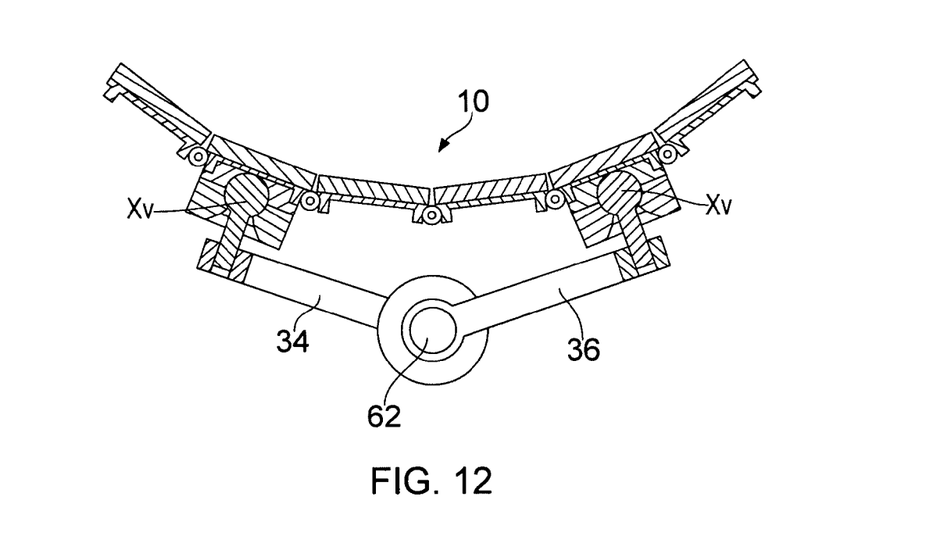
FIG. 12 is a detailed cross-sectional view of the pad arrangement of FIG. 1.
Figure 13:
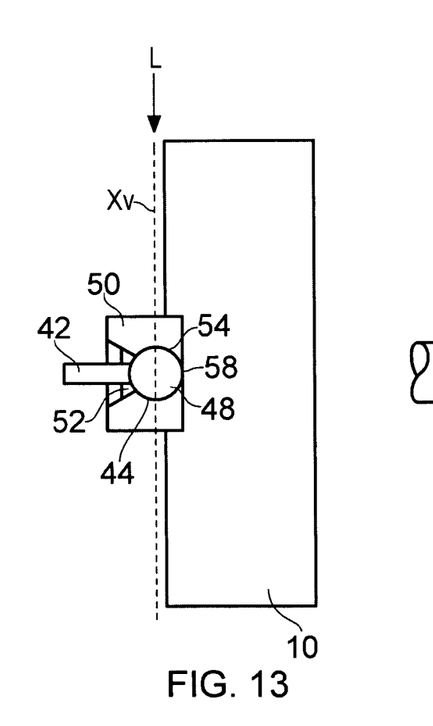
FIG. 13 is an enlarged view of the ball joint of FIG. 12.
Figure 14:
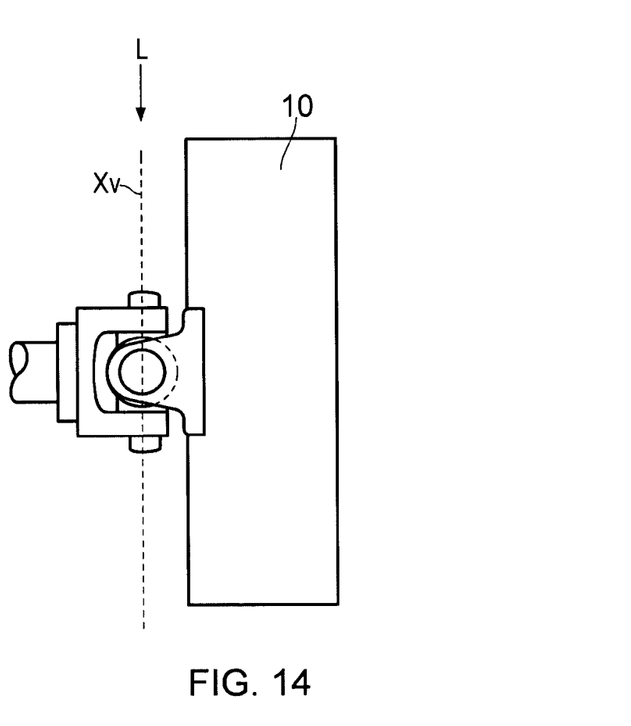
FIG. 14 is an enlarged view of a universal joint used in place of the ball joint of FIG. 12.
Figure 15:
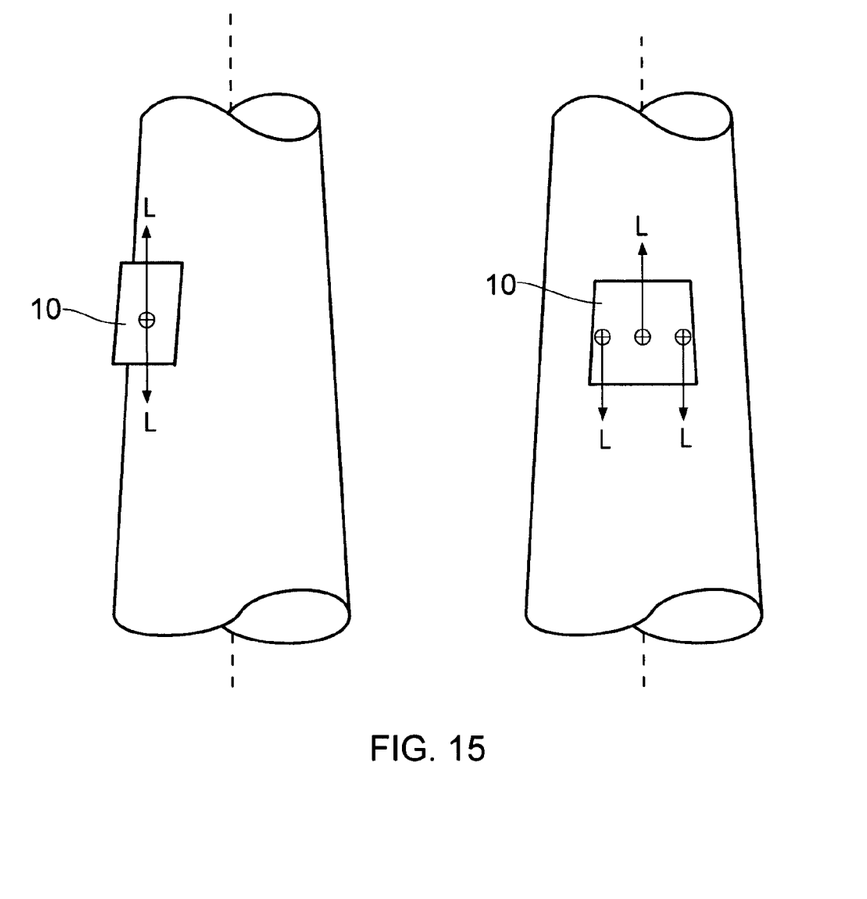
FIG. 15 is a schematic view of how pad loading is reacted in relation to a tubular structure.

FIG. 12 provides a detailed cross-sectional view of the pad arrangement of FIG. 1 and illustrates in more detail how the articulated joint in the form of a ball joint 48 fits relative to the support arm 26 and pad 10. In particular, it will be noted that the ball joint 48 has a central vertical axis $X_v$ of the ball which, in effect, becomes the axis down (or up) through which any vertical load applied to the tower will be translated. By virtue of this coupling being a universal coupling, an off axis load component will simply be constrained to pass downwardly through this axis and, as this axis is in line with the centre of pressure (see FIG. 1), any vertical load applied to the arms 26 will result in an increase in the vertical load applied to the pads but will have no impact on the radial load applied thereto. FIG. 13 illustrates in more detail the interrelationship between the axis Xv and the ball joint 38 whilst FIG. 14 illustrates how the same arrangement and load L application will be translated through a universal joint arrangement which performs the same function as the ball joint 48. FIG. 15 illustrates how the applied load L is reacted in relation to a tubular structure shown generally at 92 and discussed in more detail above.

Those skilled in the art will appreciate that the actuators 66 simply move the pads 10 into position and that the cables 82 and actuators 86 are employed to apply the clamping load itself such as to secure the structure to the tower 108. The cables are flexible so once they are wrapped around the pads and actuators 86 are activated they cause the segments of the pads to articulate about hinges 80 such that they contour to the profile of the tower 108 itself and, thus, allow for the even application of clamping load to the tower 108.

The above provides a clamping arrangement in the form of individual clamping pads 10 and support arrangements which may be used individually, in pairs or groups around a tubular article 92 such as a tower used for wind turbines and the like which may be circular, rectangular or triangular in cross-sectional shape. The clamping pads and associated actuation mechanisms including the pivot arms 26 and actuators 66 are supplemented by cables or bands 66 and tensioning actuators 84 for securely clamping the pads in a desired position such as to allow a support structure 90 to provide a working platform or the base for a crane mechanism used to remove, position or replace articles atop of elongate tubular structures such as wind turbines or the like. It will also be appreciated that the arrangement may provide a self-advancing support platform and one which distributes the loads exerted on the tubular structure in an even manner such as to allow it to be used on relatively slender and thin walled structures that might be susceptible to damage if loaded inappropriately. By selecting the point at which load is transferred from the pads 10 to the associated support arms 26 it is possible to ensure the load is transferred through the centre of effort or pressure on the inner side of the pad itself, thereby further reducing the stresses associated with such systems. Tapering of the pads may allow the arrangement to be employed on tapered structures in a manner which eliminates gaps between pads when said pads are at their preferred operating diameter, thereby further reducing the stresses associated with such systems. When employed as a crane platform the pivoting of the crane to the platform 90 and employing a lower side conformable reaction pad it is possible to reduce and possibly eliminate additional radial loading at the clamp position whilst reacting such radial loading at a point lower down the structure and at a position of greater strength and not already subjected to radial loads.

The invention claimed is:

1. A clamp for clamping a tubular article, the clamp comprising:
    one or more clamping pads for clamping to the tubular article:
    a support arm coupled to each clamping pad of said one or more clamping pads, each support arm being coupled to each clamping pad via at least two side arms, each support arm being configured to pivot about a first longitudinal axis, and the at least two side arms being configured to pivot about a second longitudinal axis; and
    a substantially annular support frame having a third longitudinal axis, wherein
        said one or more support arms are configured to pivot between a retracted position and a contracted position, and
        the at least two side arms of each support arm are configured to pivot between a first position wherein the at least two side arms of each support arm converge toward each other and a second position wherein the at least two side arms of each support arm diverge from each other.

2. The clamp as claimed in claim 1, wherein each side arm of said at least two side arms comprises a coupling portion for coupling to associated clamping pads and said associated clamping pads include at least two corresponding coupling portions for coupling to said coupling portions of said at least two side arms, each of said one or more clamping pads comprises edges and a mid portion, and each coupling portion of said at least two corresponding coupling portions of the clamping pads is positioned on either side of said mid portion of said clamping pad.

3. The clamp as claimed in claim 2, wherein said coupling portions of said at least two side arms and said clamping pads are coupled via a spherical ball joint.

4. The clamp as claimed in claim 2, wherein said coupling portions of said at least two side arms and said clamping pads are coupled via a universal joint.

5. The clamp as claimed in claim 1, wherein said one or more clamping pads comprise conformable clamping pads, each conformable clamping pad being conformable to a range of curvatures corresponding to the tubular article to which said one or more clamping pads are clamped.

6. The clamp as claimed in claim 5, wherein said one or more clamping pads comprise a plurality of longitudinally extending segments, each longitudinally extending segment of said plurality of longitudinally extending segments being adjoined to a neighboring longitudinally extending segment of said plurality of longitudinally extending segments by an articulated joint.

7. The clamp as claimed in claim 1, wherein said one or more clamping pads include a compliant surface on a clamping side thereof.

8. The clamp as claimed in claim 7, wherein said compliant surface comprises a rubber material.

9. The clamp as claimed in claim 1, wherein said one or more clamping pads include tapered edges configured to reduce a clamping force exerted by said clamp towards the tapered edges of said one or more clamping pads.

10. The clamp as claimed in claim 7, wherein said compliant surface includes tapered edges configured to reduce a clamping force exerted by said clamp towards the tapered edges of said one or more clamping pads.

11. The clamp as claimed in claim 1, wherein said one or more clamping pads taper between a minimum width at a top thereof to a maximum width at a lower end thereof.

12. The clamp as claimed in claim 1, wherein said one or more clamping pads comprise an upper portion, a lower portion, and a mid portion, and wherein said one or more support arms are coupled to said one or more clamping pads above said mid portion.

13. The clamp as claimed in claim 1, further comprising:
    an actuation mechanism for moving said one or more support arms between the retracted position and the contracted position, wherein said one or more clamping pads engage with the tubular article in the contracted position.

14. The clamp as claimed in claim 13, wherein said actuation mechanism comprises a hydraulic or pneumatic actuator.

15. The clamp as claimed in claim 13, further comprising: an actuator controller for actuating said actuators.

16. The clamp as claimed in claim 1, further comprising: a plurality of said clamps arranged in a circle around a common axis.

17. The clamp as claimed in claim 1, further comprising: a circumferentially extending securing member for securing said one or more clamping pads against the tubular article when in contact therewith.

18. The clamp as claimed in claim 17, further including a securing member actuator for actuating said circumferentially extending securing member.

19. The clamp as claimed in claim 17, wherein said circumferentially extending securing member comprises a cable extending between at least two clamping pads of said one or more clamping pads and acting on an outer side thereof to clamp said at least two clamping pads to the tubular article when engaged therewith.

20. A clamping arrangement comprising:
   an upper clamp and a lower clamp, each according to claim 1; and
   a joining portion joining said upper and lower clamps to each other, said joining portion extending between the substantially annular support frames of said upper and lower clamps.

21. The clamping arrangement as claimed in claim 20, wherein said joining portion comprises an adjustable portion which is adjustable between a contracted state and an expanded state, the adjustable portion configured to move said upper and lower clamps closer to or apart from each other.

22. The clamping arrangement as claimed in claim 21, further including an actuation mechanism for extending and retracting said adjustable portion.

23. The clamping arrangement as claimed in claim 22, further including an extension controller for controlling the extension and contraction of the actuation mechanism.

24. The clamping arrangement as claimed in claim 20, further comprising:
   a crane comprising an upper portion and a lower portion, the crane pivotally connected to at least one of said substantially annular support frames, the crane including a crane jib at said upper portion and a reaction pad at said lower portion, the reaction pad configured to engage the tubular article to which the upper clamp and lower clamp are secured, such that a horizontal load applied to the crane jib is reacted through a lower portion of the tubular article to which the clamping arrangement is clamped.

25. The clamping arrangement as claimed in claim 24, wherein said reaction pad comprises a conformable pad and is connected to said lower portion of said crane by a cable.

* * * * *